Feb. 18, 1930.  L. E. BUTZMAN  1,747,422
COMBINED RACK AND BUMPER FOR AUTOMOBILES
Filed Dec. 31, 1928  2 Sheets-Sheet 2
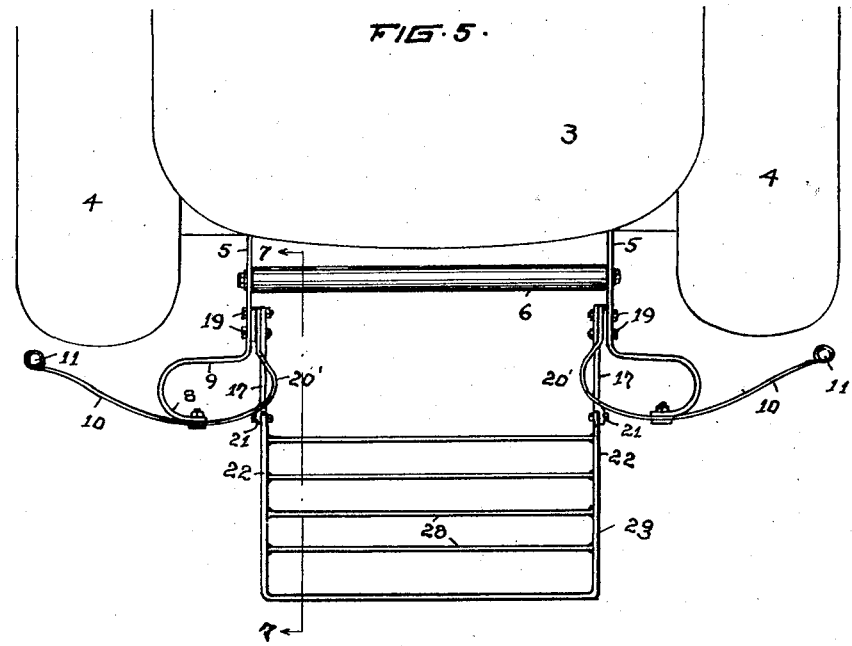
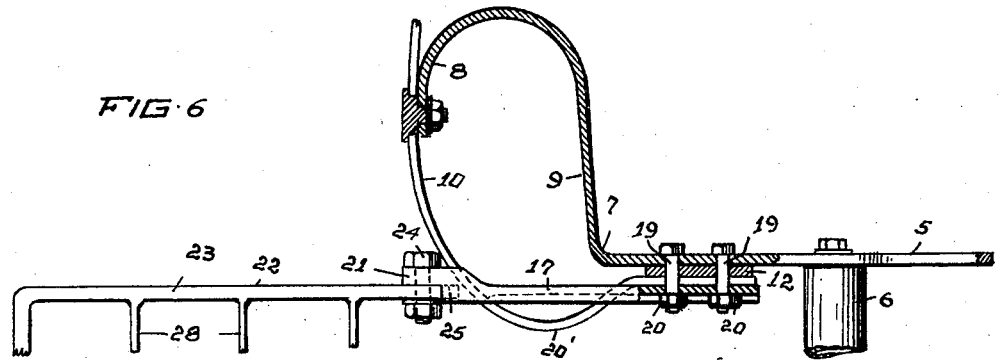
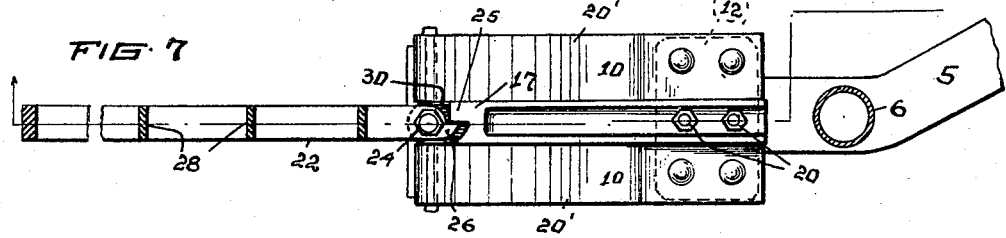
Inventor
LESTER E. BUTZMAN
By Fisher, Moser & Moore
Attorney Patented Feb. 18, 1930

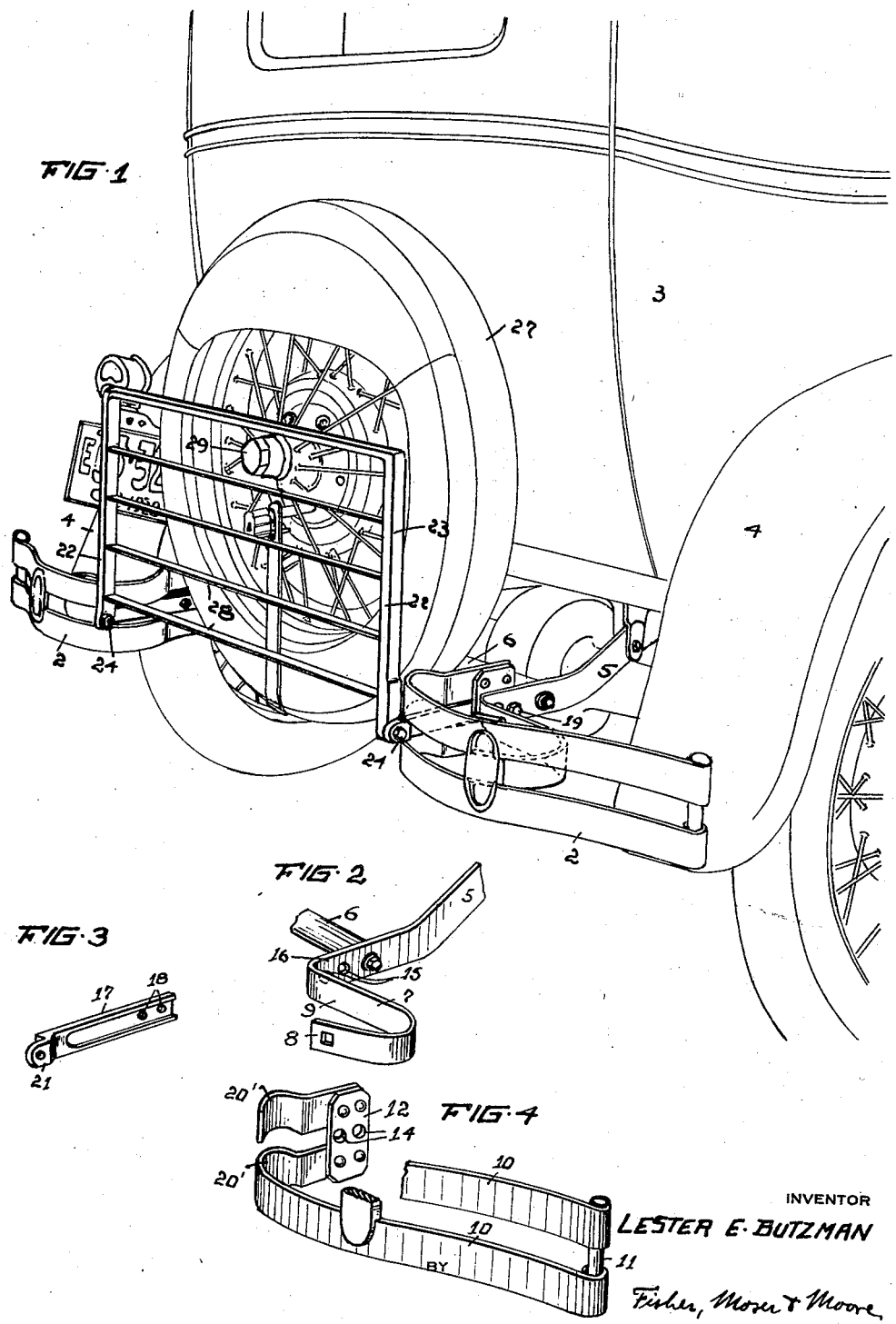

1,747,422

UNITED STATES PATENT OFFICE

LESTER E. BUTZMAN, OF CLEVELAND, OHIO, ASSIGNOR TO THE H. B. MANUFACTURING COMPANY, OF CLEVELAND, OHIO, A CORPORATION OF OHIO

COMBINED RACK AND BUMPER FOR AUTOMOBILES

Application filed December 31, 1928. Serial No. 329,319.

My invention relates to an improvement in foldable racks for automobiles, the improvement being predicated on the idea of combining a rack and a spring bar bumper in the mode and manner hereinafter described, whereby the rack may be readily utilized as a package carrier and also as a bumper extension.

In the accompanying drawings, Fig. 1 is a perspective view of the rear end of an automobile embodying a bumper and rack structure according to my invention. Fig. 2 is a perspective view of one of the bumper supporting brackets, and Fig. 3 is a perspective view of the bracket extension to which the foldable rack is pivotally attached. Fig. 4 is a perspective view, partly broken away, of one bumper section separated from the bumper bracket section. Fig. 5 is a top view of the bumper and rack showing the rack unfolded. Fig. 6 is a top view, enlarged, of the unfolded rack and a portion of one of the bumper sections, with parts thereof in section where bolted together. Fig. 7 is a side elevation and sectional view, on a larger scale, of Fig. 5, on line 7—7.

As exemplified herein the invention involves a pair of short bumpers 2—2 of corresponding form and construction secured to either the front or rear end of an automobile 3 athwart the fenders 4 at opposite sides of the body of the vehicle. Each bumper includes a supporting bar or bracket member 5 affixed at one end by bolts or other suitable means to the frame of the car. These bracket members 5 extend horizontally in spaced relation apart from the body of the car and are rigidly braced and tied together by a cross rod 6. Each bracket member or bar 5 is bent at substantially right angles to provide a spring loop 7 which terminates in a reverted spring arm 8 of shorter length than the angularly bent part 9. Two short spring impact bars 10—10 are secured in the same vertical plane at about their middle to the extremity of spring arm 8. These impact bars 10—10 are secured together at their corresponding outer ends by a hinge pin 11, and their corresponding opposite ends are riveted or bolted to a flat plate 12 having a pair of spaced bolt openings 14 therein adapted to register with a corresponding portion 16 of bar 5. An extension member or channeled bar 17 of approximately the same width as the space between the two impact bars 10 is also provided at one end with a pair of bolt openings 18. These openings are adapted to register with the pair of openings 15 in bar 5 when the extension member 17 is introduced into the space between the two impact bars with its perforated end bearing flat against plate 12. In fact all the three sets of bolt openings are in register at this time and the several parts may be firmly bolted together by two bolts 19. The nuts 20 for the bolts, or the heads of the bolts, may be seated within the channeled side of extension member 17 to prevent them from turning in bolting the parts together. When the said parts have been assembled as described the extension member or channeled bar 17 projects forwardly from the main bar or bracket member 5 and fits snugly within the space between the curved loop portions 20' of the two impact bars 10. The head 21 of each bracket extension 17 protrudes a short distance beyond the vertical impact faces of the bars 10, and the head is also offset laterally and perforated to permit a pivotal connection or hinged joint to be made with the side member 22 of a rack or grille frame 23 by means of bolts 24. An overhanging stop shoulder 25 is also formed in each head 21, which shoulder is adapted to be engaged by a projection 26 on the rounded pivotal end of side member 22 when the rack or grille frame 23 is unfolded and lowered to a horizontal position. The rack frame is thereby rigidly supported and will carry considerable weight when lowered to a horizontal position, which weight is distributed to and carried by the bumpers. On the other hand when the rack is folded or raised it lies in substantially the same vertical plane as the impact bars 10 where bent outwardly or protruded to their greatest extent. Accordingly the rack 23 will co-act with the bumpers to protect the vehicle from damage, especially in the area between the bumpers and for a substantial distance above the bumpers. The rack is also thereby spaced a substantial distance apart from the car body so that a spare wheel or tire 27 may be carried upon the car. Preferably the rack consists of an open rectangular frame having cross bars 28 spaced apart substantial distances so that the hub or hub cap 29 of the spare wheel will not be engaged by the rack when folded into an upright position. The limit of folding movement of the rack in this direction is fixed by the side members 22 when they swing upwardly against the vertical shoulders 30 on the heads 21 of the extension brackets 17. Then the rack is also held upright without the aid of a lock, inasmuch as the rack is confined between the free ends of the channeled bars or extension members 17, which are sprung apart to produce a frictional clamping pressure at the hinged joint when the rack is bolted thereto.

What I claim, is:

1. A pair of bumpers having spaced impact bars, bracket members supporting said bumpers in spaced relation, a rack hinged to fold upwardly between said members in substantially the same vertical plane as a part of the impact area of said bumpers and supporting members for said rack attached to said bracket members and extending through the space between said bars.

2. A bumper having spaced impact bars, a folding rack, and supporting members for said rack extending through the space between said bars.

3. A bumper having vertically spaced impact bars, a bracket supporting said bumper, a folding rack, and an extension from said bracket extending through the space between said bars and supporting said rack.

4. A folding rack, and a pair of supporting members therefor having bolt openings at one end thereof, in combination with a bumper and a pair of bumper brackets, and bolts for securing said rack supporting members and said bumper conjointly to said brackets.

In testimony whereof I affix my signature.

LESTER E. BUTZMAN.